US012520073B2

(12) United States Patent
Park et al.

(10) Patent No.: US 12,520,073 B2

(45) Date of Patent: Jan. 6, 2026

(54) ELECTRONIC DEVICE INCLUDING SPEAKER

(71) Applicant: SAMSUNG ELECTRONICS CO., LTD., Suwon-si (KR)

(72) Inventors: Haekeu Park, Suwon-si (KR); Sungjin Kim, Suwon-si (KR); Sohee Kim, Suwon-si (KR); Byeongmin Lee, Suwon-si (KR); Juhee Chang, Suwon-si (KR); Hyeonyeong Jeong, Suwon-si (KR); Kiwook Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 18/109,475

(22) Filed: Feb. 14, 2023

(65) Prior Publication Data

US 2023/0269522 A1 Aug. 24, 2023

Related U.S. Application Data

(63) Continuation of application No. PCT/KR2023/001424, filed on Jan. 31, 2023.

(30) Foreign Application Priority Data

Feb. 18, 2022 (KR) ........................ 10-2022-0021660
Mar. 22, 2022 (KR) ........................ 10-2022-0035616

(51) Int. Cl.
*H04R 9/06* (2006.01)
*H04R 1/02* (2006.01)
(Continued)

(52) U.S. Cl.
CPC ........... *H04R 1/1075* (2013.01); *H04R 1/023* (2013.01); *H04R 1/1016* (2013.01);
(Continued)

(58) Field of Classification Search
CPC .... H04R 1/1075; H04R 1/023; H04R 1/1016; H04R 1/1025; H04R 9/046; H04R 9/06
See application file for complete search history.

(56) References Cited

U.S. PATENT DOCUMENTS

| | | | | |
|---|---|---|---|---|
| 7,003,127 B1 * | 2/2006 | Sjursen | .................. | H04R 25/65 381/328 |
| 2006/0233415 A1 | 10/2006 | Chung et al. | | |

(Continued)

FOREIGN PATENT DOCUMENTS

| | | |
|---|---|---|
| CN | 107852548 | 3/2018 |
| JP | 2005-243929 A | 9/2005 |

(Continued)

OTHER PUBLICATIONS

PCT International Search Report dated May 12, 2023 for PCT/KR2023/001424.

(Continued)

*Primary Examiner* — Suhan Ni

(74) *Attorney, Agent, or Firm* — Nixon & Vanderhye P.C.

(57) ABSTRACT

An electronic device may include a housing, a first frame disposed inside the housing and including a first surface, a second frame forming an internal space by being coupled with the first frame, and including a second surface opposed to the first surface, a speaker disposed in the internal space and including at least one voice coil, and a battery disposed on a side of the second frame. The second frame may include at least one frame hole, and a ratio μ/μ0 of a magnetic permeability to a vacuum permeability of at least one of a material of the first frame or a material of the second frame may be equal to or greater than 1000.

20 Claims, 19 Drawing Sheets

(51) Int. Cl.
*H04R 1/10* (2006.01)
*H04R 9/04* (2006.01)

(52) U.S. Cl.
CPC ........... *H04R 1/1025* (2013.01); *H04R 9/046* (2013.01); *H04R 9/06* (2013.01); *H04R 2400/11* (2013.01)

(56) References Cited

U.S. PATENT DOCUMENTS

| | | | |
|---|---|---|---|
| 2008/0205691 | A1 | 8/2008 | Beekman et al. |
| 2011/0044485 | A1 | 2/2011 | Lin et al. |
| 2017/0041715 | A1 | 2/2017 | Jumani et al. |
| 2020/0382857 | A1 | 12/2020 | Malaver |
| 2020/0404425 | A1 | 12/2020 | Zhao et al. |
| 2021/0250676 | A1 | 8/2021 | Kim et al. |
| 2021/0297786 | A1 | 9/2021 | Ji et al. |

FOREIGN PATENT DOCUMENTS

| | | | |
|---|---|---|---|
| KR | 10-1419202 | | 7/2014 |
| KR | 10-1558091 | B1 | 10/2015 |
| KR | 10-2172832 | | 10/2020 |
| KR | 10-2203376 | B1 | 1/2021 |
| KR | 10-2021-0101597 | A | 8/2021 |
| KR | 10-2021-0134193 | | 11/2021 |
| KR | 10-2022-0012554 | A | 2/2022 |

OTHER PUBLICATIONS

PCT Written Opinion dated May 12, 2023 for PCT/KR2023/001424.

Extended European Search Report dated Feb. 17, 2025 for EP Application No. 23756544.5.

* cited by examiner

ELECTRONIC DEVICE INCLUDING SPEAKER

CROSS REFERENCE TO RELATED APPLICATIONS

This application is a continuation of International Application No. PCT/KR2023/001424 filed on Jan. 31, 2023, designating the United States, in the Korean Intellectual Property Receiving Office, and claiming priority to Korean Patent Application No. 10-2022-0021660 filed on Feb. 18, 2022, and Korean Patent Application No. 10-2022-0035616 filed on Mar. 22, 2022, the disclosures of which are all hereby incorporated by reference herein in their entireties.

BACKGROUND

Field

Various example embodiments relate to an electronic device including a speaker.

Description of Related Art

Along with the development of electronic technology, there are demands for miniaturization and diverse functions in various types of wearable electronic devices. To satisfy the demands, various electronic components are mounted on a printed circuit board (PCB).

At least one sound effect-related component may be mounted on a PCB in a wearable electronic device. Sound effect-related components may include, for example, a speaker and a microphone. These components may be mounted in various shapes and arrangement structures corresponding to various exterior designs of the wearable electronic device in a housing of the wearable electronic device.

The wearable electronic device having the speaker and the microphone mounted therein may be, for example, an in-ear earphone (an earset, a headphone, or a headset) or a hearing aid. The wearable electronic device may be worn near a user's ear and manufactured in a compact size for this purpose.

SUMMARY

A wearable electronic device that is wearable on the body may include at least one sound effect-related component. For example, a wearable electronic device including a speaker and a microphone may be worn near a user's ear, such as an in-ear earphone (or an earset) or a hearing aid.

The miniaturization of wearable electronic devices leads to miniaturization and/or reduction of electronic components mounted in the wearable electronic devices. As a wearable electronic device becomes smaller and electronic components are arranged in a smaller space, a component used for wireless communication and another component disposed inside the electronic device are very close, thus affecting each other. For example, a speaker and a battery may be disposed very close to each other, and electromagnetic waves generated from the battery may cause unintended noise in the speaker.

According to various example embodiments, an electronic device including a speaker that does not generate significant unintended noise may be provided.

However, the problems to be solved in the disclosure are not limited to the above-mentioned problems, and may be variously extended without departing from the spirit and scope of the disclosure.

An electronic device according to various example embodiments may include a housing, a first frame disposed inside the housing and including a first surface, a second frame forming an internal space by being coupled with the first frame, and including a second surface opposed to the first surface, a speaker disposed in the internal space and including at least one voice coil, and a battery disposed on one side of the second frame. The second frame may include at least one frame hole, and a ratio $\mu/\mu0$ of a magnetic permeability to a vacuum permeability of at least one of a material of the first frame or a material of the second frame may be equal to or greater than 1000.

An electronic device according to various example embodiments may include a housing, a first frame disposed inside the housing and including a first surface, a second frame forming an internal space by being coupled with the first frame, and including a second surface opposed to the first surface, a speaker disposed in the internal space and including a first voice coil and a second voice coil, and a battery disposed on one side of the second frame. The second frame may include at least one frame hole, and a ratio $\mu/\mu0$ of a magnetic permeability to a vacuum permeability of at least one of a material of the first frame or a material of the second frame may be equal to or greater than 1000.

An electronic device according to various example embodiments may provide a speaker affected less by electromagnetic waves generated from a battery. Therefore, significant unintended noise may not be generated in the speaker.

BRIEF DESCRIPTION OF THE DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
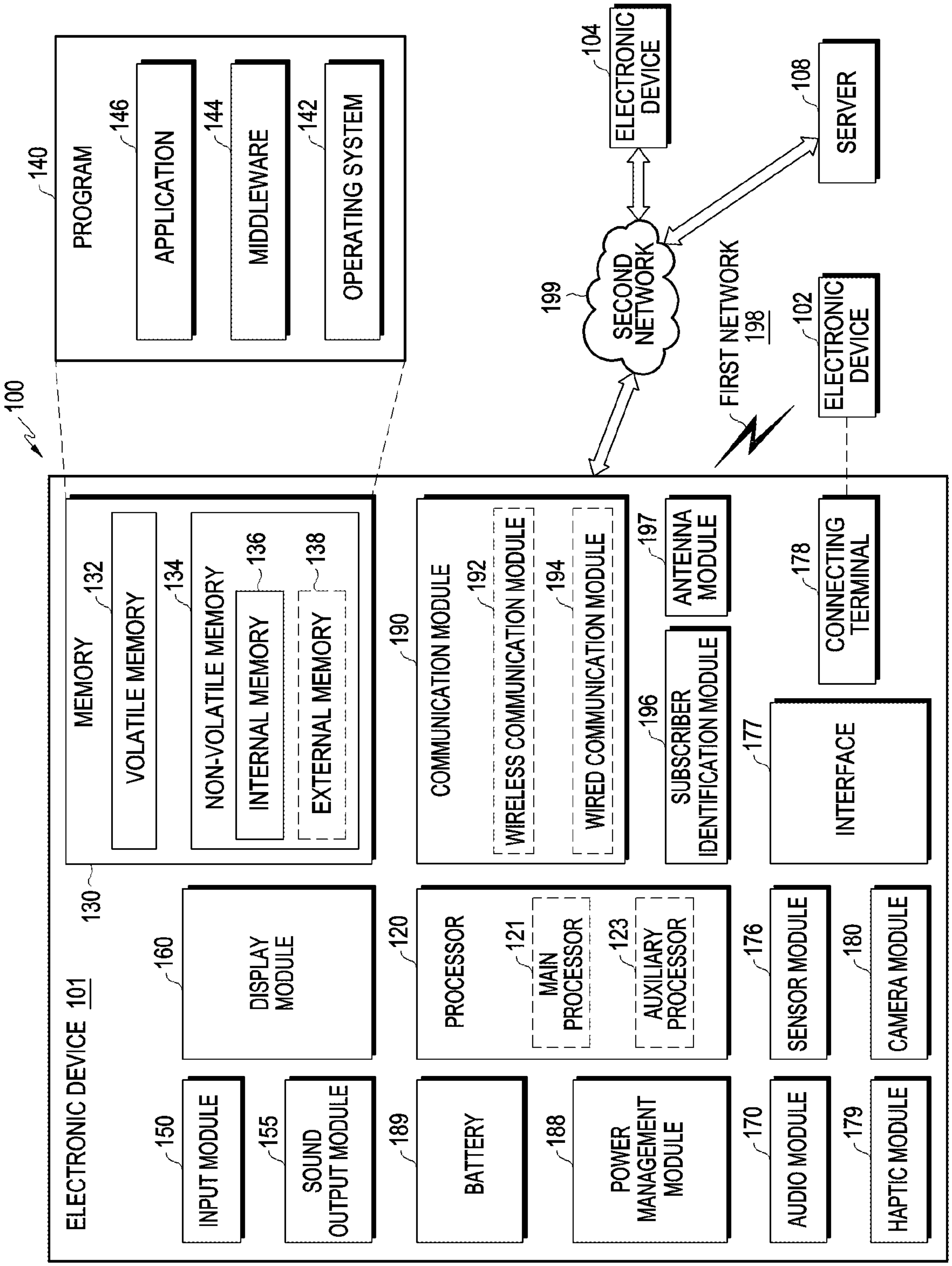
FIG. 1 is a block diagram illustrating an electronic device in a network environment according to various example embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134 (which may include internal memory 136 and/or external memory 138). According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “1st” and “2nd”, or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), it means that the element may be coupled with the other element directly (e.g., wiredly), wirelessly, or via at least a third element.

As used in connection with various example embodiments, the term “module” may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC). Thus, each “module” herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
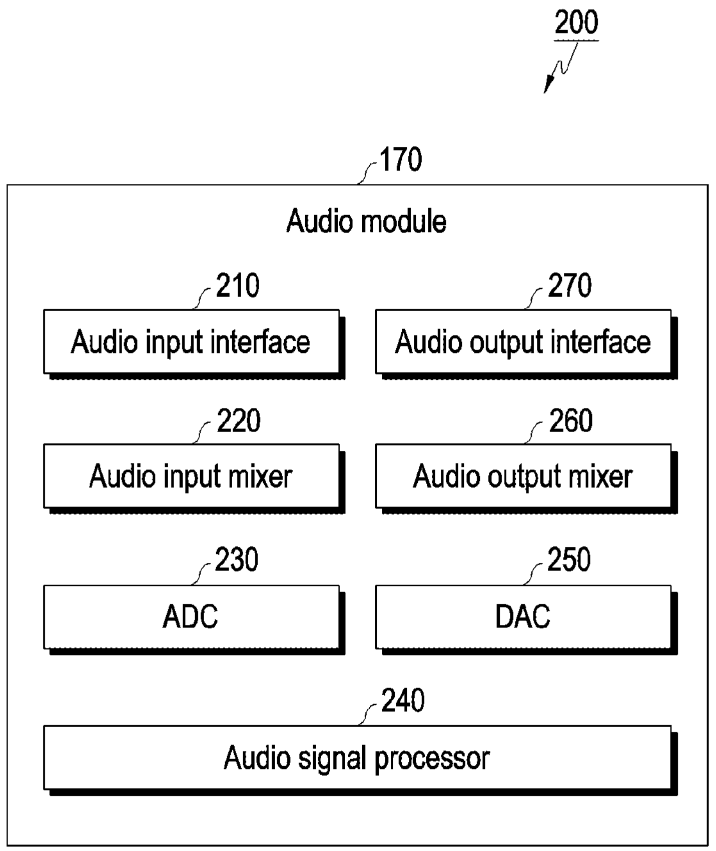
FIG. 2 is a block diagram illustrating an audio module according to various example embodiments.

FIG. 2 is a block diagram 200 illustrating the audio module 170 according to various embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal. Each processor herein comprises processing circuitry.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
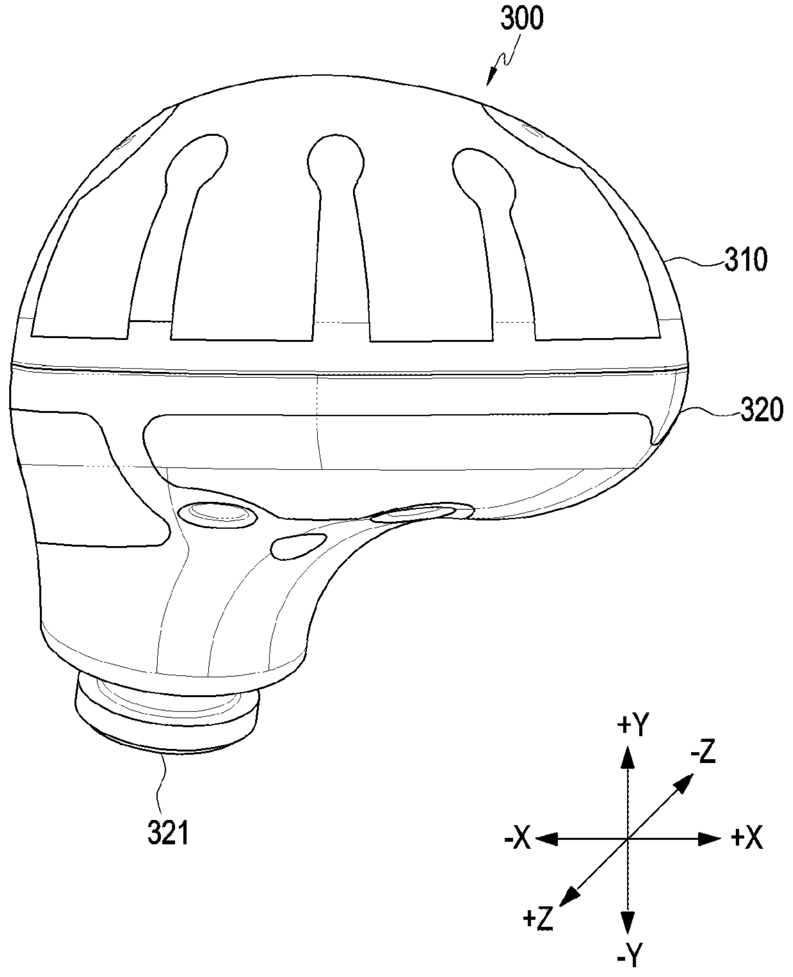
FIG. 3 is a perspective view illustrating an electronic device according to various example embodiments.

FIG. 3 is a perspective view illustrating an electronic device 300 according to various embodiments.

The electronic device 300 illustrated in FIG. 3 may be the same as or similar to the electronic device 101 illustrated in FIG. 1. Accordingly, a description of the same configuration may be omitted.

Referring to FIG. 3, the electronic device 300 may include a first housing 310 and a second housing 320 coupled to the first housing 310.

According to various embodiments, the electronic device 300 may correspond to an electronic device wearable on a body part (e.g., a user's ear or head). The electronic device 300 may include an in-ear earset, an in-ear headset, or a hearing aid. Besides, the electronic device 101/200/300 may include various electronic devices in which a speaker is mounted.

In the various drawings disclosed in this document, a kernel-type in-ear earset mounted on the external auditory meatus leading from the pinna to the eardrum may be described as an example of the electronic device 300. The disclosure is not limited thereto, and the electronic device 300 may be an open-type earphone mounted on the pinna.

According to various embodiments, the electronic device 300 may be coupled to an external electronic device wiredly or wirelessly. In this case, the electronic device 300 may serve as an audio output device that outputs a sound signal generated from the external electronic device to the outside. In an example, the electronic device 300 may serve as an audio input device for receiving an audio signal corresponding to a sound obtained from the outside of the external electronic device.

According to various embodiments, the first housing 310 and the second housing 320 may include curved surfaces having a specified curvature. In an example, the first housing 310 may extend seamlessly from one end thereof to be coupled to the second housing 320. For example, the first housing 310 and the second housing 320 may be formed to contact each other on an X-Z plane.

According to various embodiments, the first housing 310 or the second housing 320 may be formed of coated or tinted glass, ceramic, polymer, metal (e.g., aluminum, stainless steel (STS), or magnesium), resin (e.g., polycarbonate, polyethylene, polypropylene, or polystyrene), or a combination of at least two of the above materials.

In an example, the first housing 310 and the second housing 320 may be formed by injection.

According to various embodiments, the second housing 320 may include a protrusion 321 seated on an ear of a user who uses the electronic device 300. In an example, the protrusion 321 may be formed to extend in a −Y-axis direction from the second housing 320.

The electronic device 300 illustrated in FIG. 3 corresponds to one example, not limiting the shape of a device to which the technical idea is applied. The technical idea is applicable to various types of wearable electronic devices including a protrusion to be seated on an ear. For example, the technical idea may also be applied to a wearable electronic device in the shape of a kidney bean.

Various embodiments will be described below in the context of the electronic device 300 illustrated in FIG. 3, for convenience of description.

Figure 4:
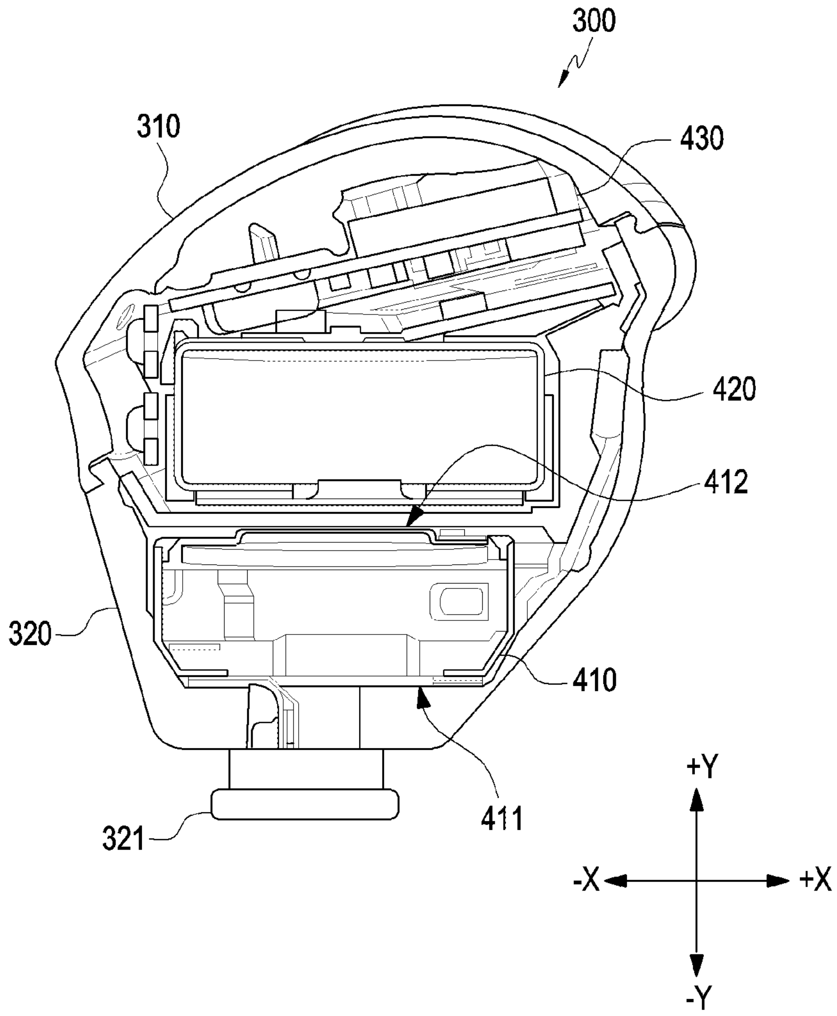
FIG. 4 is a cross-sectional view illustrating an electronic device viewed from a side thereof according to various example embodiments.

FIG. 4 is a cross-sectional view illustrating the electronic device 300, viewed from a side thereof according to various embodiments. The cross-sectional view of FIG. 4 may be understood as a side view of the electronic device 300 of FIG. 3 viewed in a +Z axis direction.

Referring to FIG. 4, the electronic device 300 may include a speaker 410, a battery 420, and a circuit board 430 (e.g., a printed circuit board (PCB), a printed board assembly (PBA), a flexible PCB (FPCB), or a rigid-flexible PCB (RFPCB)) in an internal space formed by the first housing 310 and the second housing 320. In an example, the electronic device 300 may further include a component other than the components illustrated in FIG. 4. For example, the electronic device 300 may further include a wireless communication circuit or a microphone in the internal space formed by the first housing 310 and the second housing 320. In another example, some of the components of the electronic device 300 illustrated in FIG. 4 may be omitted or replaced with other similar components. For example, the electronic device 300 may be configured such that the protrusion 321 does not protrude outward from the electronic device 300.

According to various embodiments, the electronic device 300 may include the speaker 410 inside the second housing 320 so as to be adjacent to the protrusion 321. The speaker 410 may function to receive an electrical signal through a circuit (e.g., the circuit board 430) inside the electronic device 300 and convert the received electrical signal into physical vibrations.

According to various embodiments, the speaker 410 may be disposed in parallel with the battery 420 in the second housing 320.

According to various embodiments, the speaker 410 may include a first surface 411 facing the protrusion 321 (e.g., in the −Y-axis direction in FIG. 4), and a second surface 412 opposite to the first surface 411 (e.g., in a +Y-axis direction of FIG. 4).

According to various embodiments, the speaker 410 may output a front-radiated sound through the first surface 411 facing the protrusion 321. The speaker 410 may output a rear-radiated sound through the second surface 412 opposite to the first surface 411.

According to various embodiments, the structure of the speaker 410 will be described in detail together with a description of FIGS. 7A, 7B, and 7C.

According to various embodiments, the battery 420 may be disposed in the internal space of the electronic device 300 formed by coupling between the first housing 310 and the second housing 320. In an example, components included in the electronic device 300 may be driven by power output from the battery 420.

According to various embodiments, the battery 420 may include a negative electrode plate, a positive electrode plate, a separator, and an electrolyte. In an example, the negative electrode plate and the positive electrode plate included in the battery 420 may form a winding structure.

According to various embodiments, the battery 420 may be disposed in an area corresponding to the second surface 412 of the speaker 410. In an example, the battery 420 may be disposed to face the second surface 412 of the speaker 410. In an example, the battery 420 may be stacked on the second surface 412 of the speaker 410. In an example, the battery 420 may be disposed to be spaced apart from the protrusion 321 by a predetermined distance.

According to various embodiments, the battery 420 may include a first surface facing the speaker 410 (e.g., in the −Y-axis direction in FIG. 4) and a second surface opposite to the first surface (e.g., in the +Y-axis direction in FIG. 4).

According to various embodiments, the circuit board 430 may be disposed in the internal space of the electronic device 300 formed by the coupling between the first housing 310 and the second housing 320. In an example, at least one electronic component (e.g., the communication module 190, comprising communication circuitry, or the sensor module 176 of FIG. 1 comprising at least one sensor) may be mounted on the circuit board 430.

According to various embodiments, the circuit board 430 may include a printed circuit board (PCB), or a flexible printed circuit board (FPCB).

According to various embodiments, the circuit board 430 may be disposed above the second surface of the battery 420 (e.g., in the +Y-axis direction of FIG. 4).

According to various embodiments, a space for accommodating other electronic components in addition to the speaker 410, the battery 420, and the circuit board 430 may further be formed in the internal space formed by the coupling between the first housing 310 and the second housing 320. While the speaker 410, the battery 420, and the printed circuit board 430 are shown as arranged in parallel in FIG. 4, this arrangement does not necessarily limit the internal shapes of the first housing 310 and the second housing 320 and the arrangement of the components. The detailed arrangement of the components included in the first housing 310 and the second housing 320 may vary according to embodiments.

Figure 5:
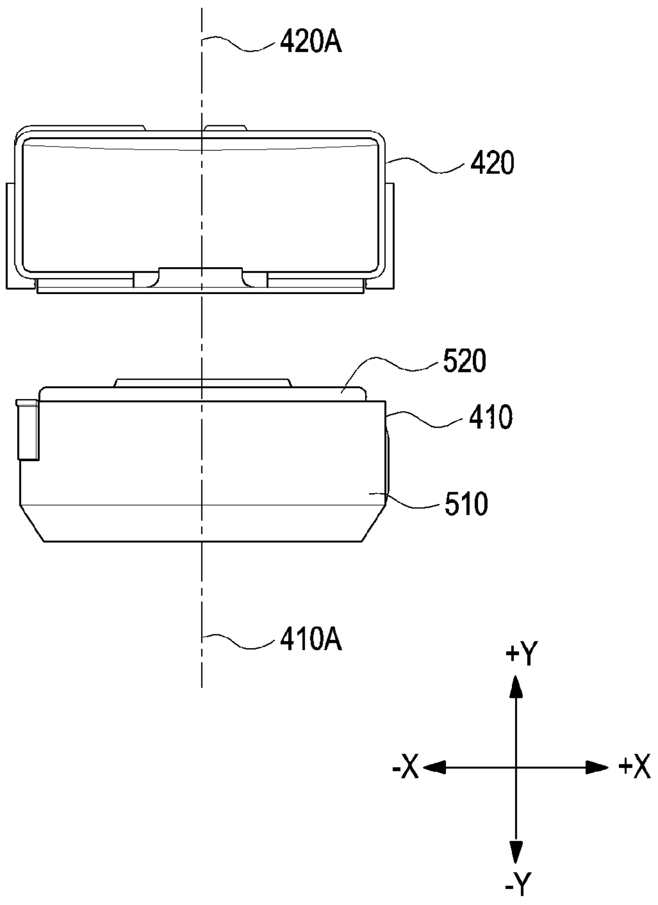
FIG. 5 is a side view illustrating a speaker and a battery according to various example embodiments.

FIG. 5 is a side view illustrating a speaker and a battery according to various example embodiments.

The speaker 410 and the battery 420 illustrated in FIG. 5 may be the same as or similar to the speaker 410 and the battery 420 illustrated in FIG. 4. Accordingly, a description of the same configuration may be omitted.

Referring to FIG. 5, according to various embodiments, the speaker 410 and the battery 420 may be disposed adjacent to each other. For example, the speaker 410 may be disposed in one direction (the −Y-axis direction) of the battery 420.

According to various embodiments, the speaker 410 may be formed to be substantially circular. The speaker 410 may be formed to be circular with respect to a central axis 410A.

According to various embodiments, the battery 420 may be formed to be substantially circular. The battery 420 may be formed to be circular with respect to a central axis 420A.

According to various embodiments, the central axis 410A of the speaker 410 and the central axis 420A of the battery 420 may be disposed adjacent to each other or may coincide with each other.

According to various embodiments, the speaker 410 may receive power directly or indirectly from the battery 420 and convert an electrical signal into wave energy. The speaker 410 may include a first frame 510 and a second frame 520. According to an embodiment, the speaker 410 may be electrically coupled directly to the battery 420 to receive power from the battery 420. According to an embodiment, as the speaker 410 is electrically coupled to the circuit board 430 and the circuit board 430 is electrically coupled to the battery 420, the speaker 410 may receive power from the battery 420 through the circuit board 430. According to an embodiment, the speaker 410 may be electrically coupled to a power management module (e.g., the power management module 188 of FIG. 1 comprising power management integrated circuit (PMIC)) to receive power from the power management module 188.

According to various embodiments, the first frame 510 may be formed as a circular cylinder having openings formed at both ends thereof in one axial direction (a Y-axis direction). The second frame 520 may be disposed in one direction (the +Y-axis direction) of the first frame 510. The outer surface of the second frame 520 may be disposed to contact the inner surface of the first frame 510. As the first frame 510 and the second frame 520 come into contact with each other, the first frame 510 and the second frame 520 may form an internal space. Various electronic components may be disposed in the internal space formed by the first frame 510 and the second frame 520.

Figure 6A:
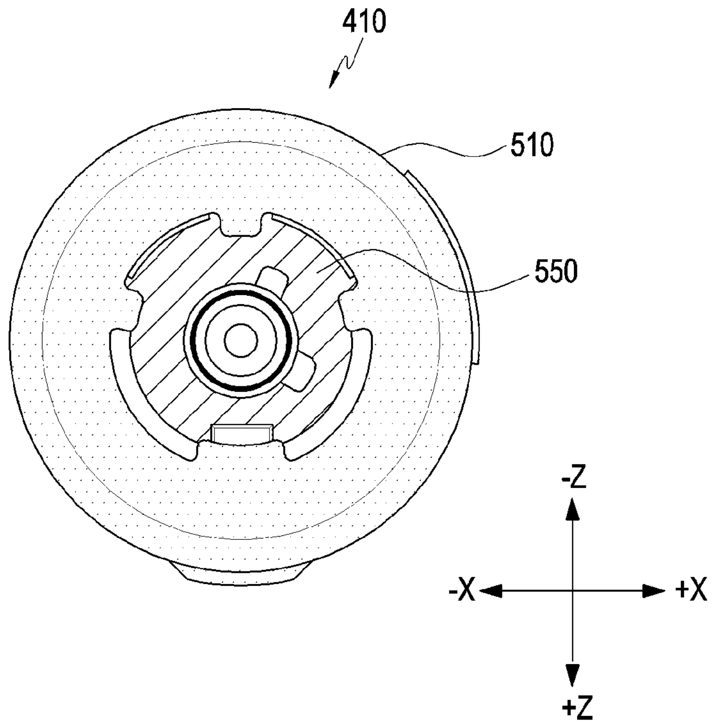
FIG. 6A is a plan view illustrating a speaker viewed in a +Y-axis direction according to various example embodiments.
Figure 6B:
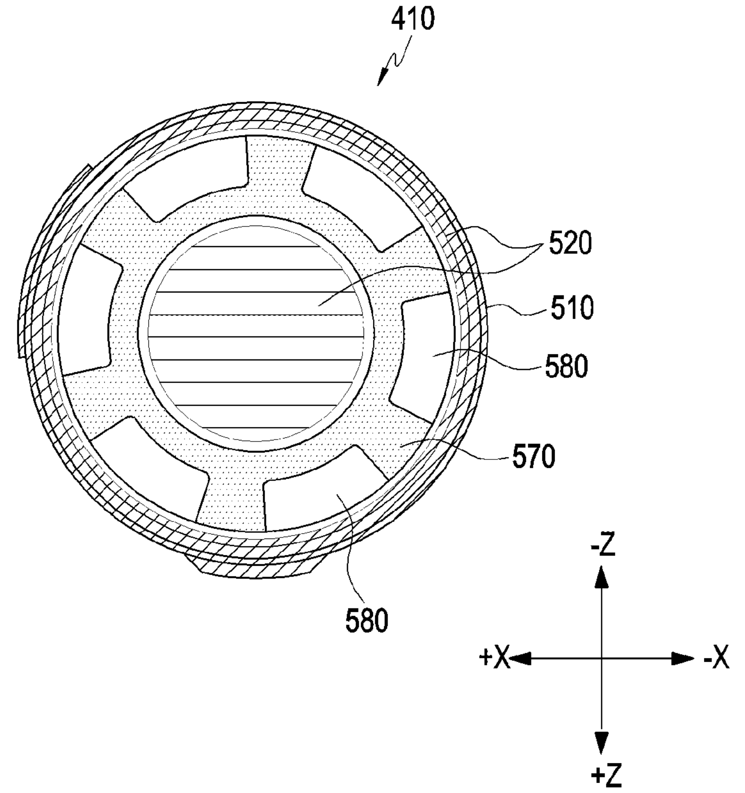
FIG. 6B is a bottom view illustrating a speaker viewed in a −Y-axis direction according to various example embodiments.
Figure 6C:
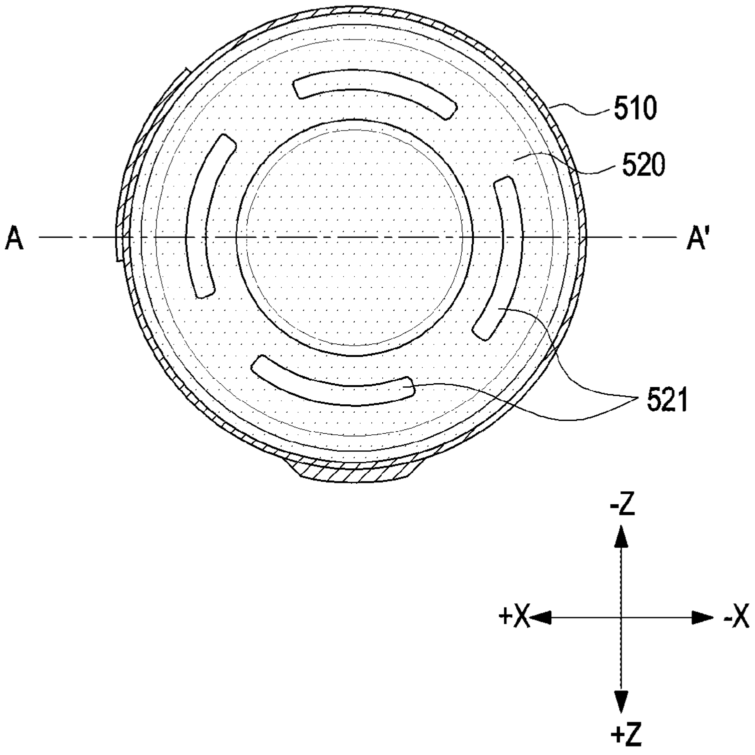
FIG. 6C is a bottom view illustrating a speaker viewed in the −Y-axis direction according to various example embodiments.

FIG. 6A is a plan view illustrating a speaker viewed in the +Y-axis direction according to various example embodiments, FIG. 6B is a bottom view illustrating a speaker viewed in the −Y-axis direction according to various example embodiments, and FIG. 6C is a bottom view illustrating a speaker viewed in the −Y-axis direction according to various example embodiments.

The speaker 410 illustrated in FIGS. 6A, 6B, and 6C may be the same as or similar to the speaker 410 illustrated in FIG. 5. Accordingly, a description of the same configuration may be omitted.

Referring to FIG. 6A, according to various embodiments, the speaker 410 may include the first frame 510. A plate 550 may be disposed inside the first frame 510. The plate 550 will be described later in conjunction with the description of FIGS. 7A, 7B, and 7C.

Referring to FIG. 6B, according to various embodiments, the speaker 410 may include the first frame 510, the second frame 520, an adhesive member 570, and a protection member 580.

According to various embodiments, the first frame 510 and the second frame 520 may be coupled with each other to form an internal space. The adhesive member 570 may be disposed on one surface (the +Y-axis direction) of the second frame 520. The adhesive member 570 may be disposed on one surface (the +Y-axis direction) of the second frame 520 to be in contact with the protection member 580.

According to various embodiments, the protection member 580 may be disposed on one surface (the +Y-axis direction) of the adhesive member 570 so as to be in contact with the adhesive member 570.

Referring to FIG. 6C, according to various embodiments, a frame hole 521 may be formed in the second frame 520. The frame hole 521 may be formed on the one surface (the +Y-axis direction) of the second frame 520, so that a sound generated from the speaker 410 may be smoothly transmitted to the outside. Frame holes 521 may be formed to be symmetrical with respect to the central axis of the speaker 410 (e.g., the central axis 410A of FIG. 5A), and may be formed in the shape of an arc.

Figure 7A:
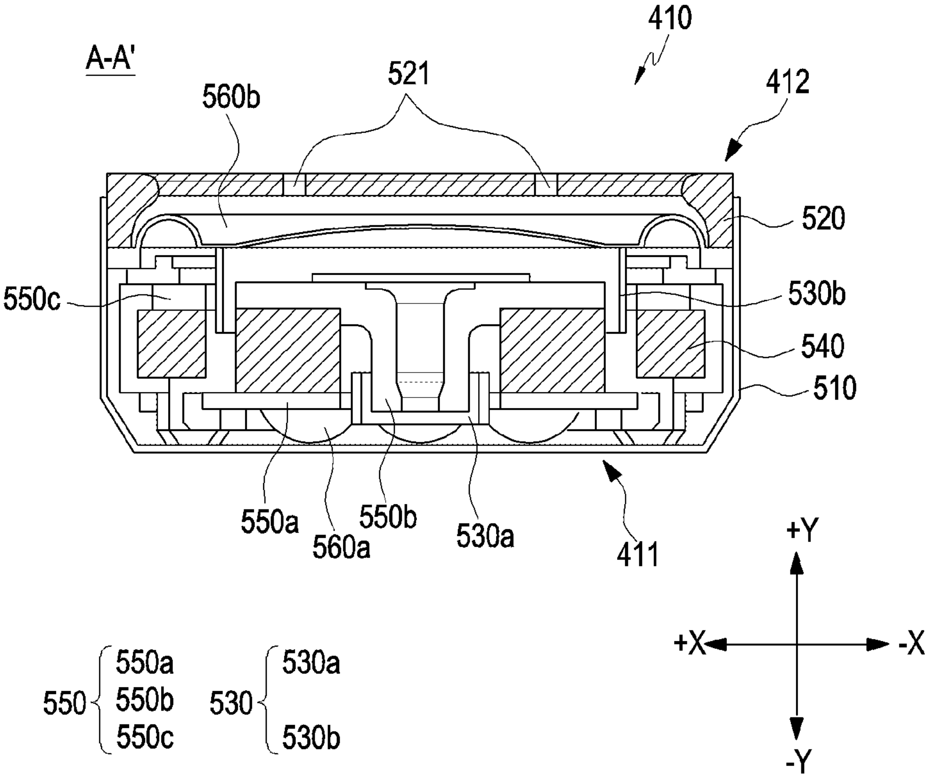
FIG. 7A is a cross-sectional view illustrating a speaker viewed from a side thereof according to various example embodiments.
Figure 7B:
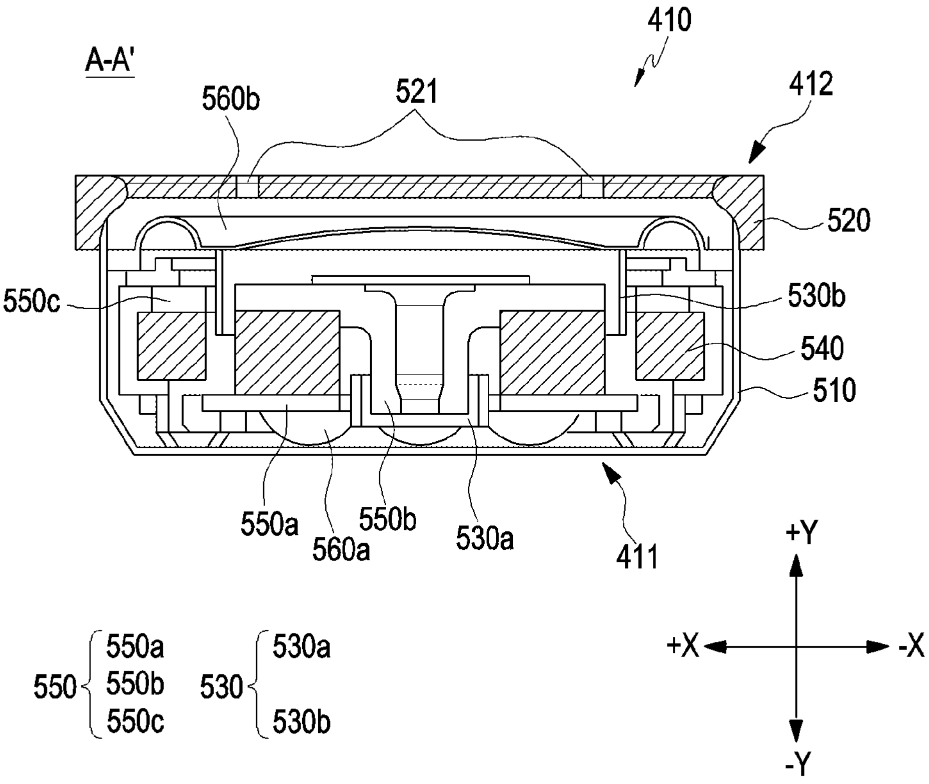
FIG. 7B is a cross-sectional view illustrating a speaker viewed from a side thereof according to various example embodiments.
Figure 7C:
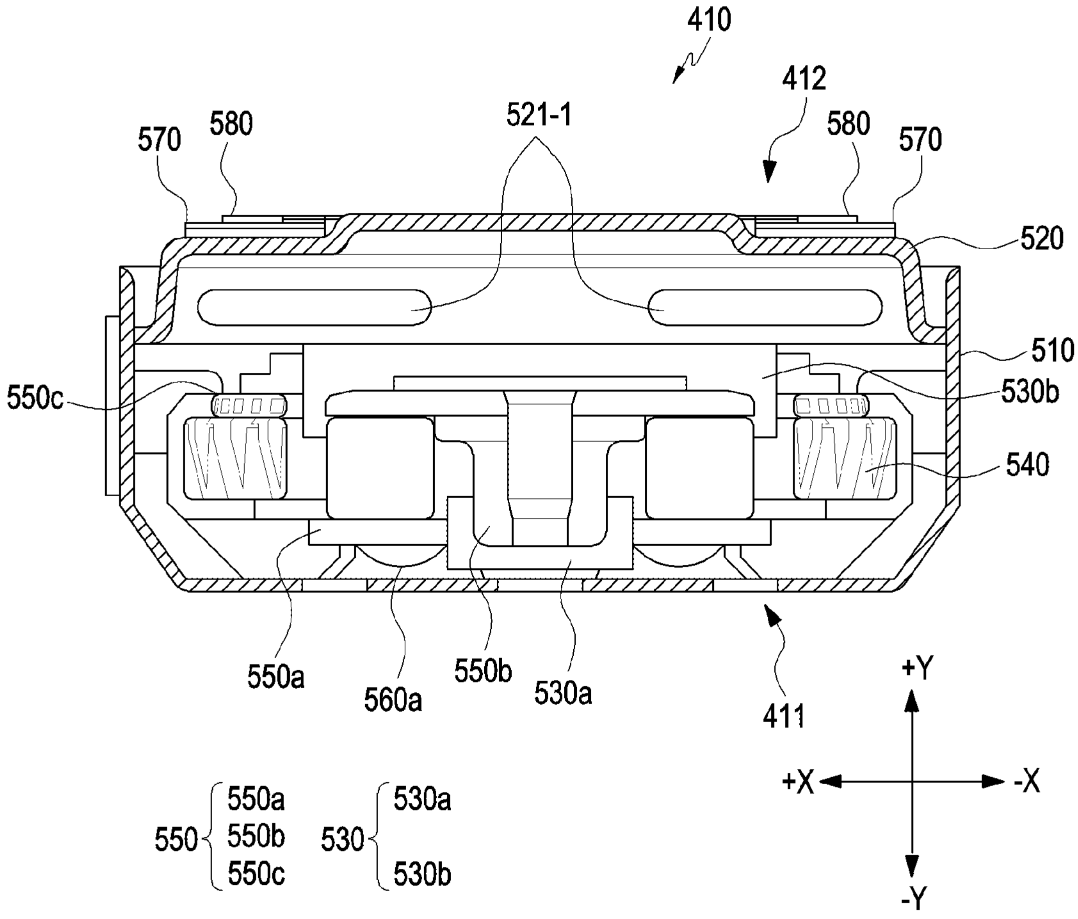
FIG. 7C is a cross-sectional view illustrating a speaker viewed from a side thereof according to various example embodiments.

FIG. 7A is a cross-sectional view illustrating a speaker viewed from a side thereof according to various example embodiments, FIG. 7B is a cross-sectional view illustrating a speaker viewed from a side thereof according to various example embodiments, and FIG. 7C is a cross-sectional view illustrating a speaker viewed from a side thereof according to various example embodiments.

FIG. 7A is a cross-sectional view of the A-A' line of FIG. 6C.

FIG. 7B is a cross-sectional view of the A-A' line of FIG. 6C.

The speaker 410, the first frame 510, and the second frame 520 illustrated in FIGS. 7A, 7B, and 7C may be the same as or similar to the speaker 410, the first frame 510, and the second frame 520 illustrated in FIGS. 4, 5, 6A, 6B, and 6C. Accordingly, a description of the same configuration may be omitted.

Referring to FIGS. 7A, 7B, and 7C, according to various embodiments, the speaker 410 may convert an electrical signal into physical vibrations and hence a sound audible to the user. The speaker 410 may include a device required to output a sound and a frame for protecting the device. The speaker 410 may include the first frame 510 and the second frame 520.

Referring to FIGS. 7A, 7B, and 7C, the speaker 410 may include the first surface 411 facing a protrusion (e.g., the protrusion 321 of FIG. 4) and the second surface 412 opposite to the first surface 411.

According to various embodiments, the speaker 410 may emit a front-radiated sound through the first surface 411. In an example, the speaker 410 may emit a rear-radiated sound through the second surface 412 opposite to the first surface 411.

According to various embodiments, the speaker 410 may include the first frame 510 including the first surface 411 and the second frame 520 including the second surface 412. In an example, the first frame 510 and the second frame 520 may be separately manufactured and coupled with each other. In an example, various components required to output a sound through the speaker 410 may be disposed in an internal space formed by the coupling between the first frame 510 and the second frame 520. In an embodiment, a voice coil 530, a first diaphragm 560*a,* a second diaphragm 560*b,* a magnet 540, and the plate 550 may be included in the internal space formed by the coupling between the first frame 510 and the second frame 520. The voice coil 530 may include a first voice coil 530*a* and a second voice coil 530*b*.

According to various embodiments, the first frame 510 including the first surface 411 may be disposed to surround the second frame 520. In an example, the first frame 510 may include a shape that may be coupled with the second frame 520. In an example, the thickness of the first frame 510 may correspond to about 0.15 mm.

According to various embodiments, the second frame 520 may include a plurality of frame holes (e.g., the frame holes 521 of FIG. 6C). In an example, at least one area of the second surface 412 included in the second frame 520 may include the plurality of frame holes 521. In an example, a rear-radiated sound may be output through the plurality of frame holes 521 included in the second frame 520. In an example, the second frame 520 may be coupled to a resonance space of the speaker 410 through the plurality of frame holes 521 included in the second frame 520.

According to various embodiments, as the frame holes 521 are formed in the second frame 520, air may smoothly flow into and out of the second frame 520 through the frame holes 521. As described above, as air smoothly flows into and out of the second frame 520, the first voice coil 530*a* and/or the second voice coil 530*b* may be configured to vibrate better. Accordingly, the air impedance of the speaker 410 may be reduced.

According to various embodiments, a battery (e.g., the battery 420 of FIG. 4) may be disposed in an area facing the second frame 520 including the second surface 412. In an example, the battery 420 may be disposed in an area corresponding to the second surface 412 of the speaker 410.

According to various embodiments, the first frame 510 may be formed of a material having a first permeability. The second frame 520 may be formed of a material having a second permeability.

According to various embodiments, the first frame 510 may be formed of a material having a high permeability. According to an embodiment, the first frame 510 may be formed of a material having a ratio ($\mu/\mu 0$) of a magnetic permeability to a vacuum permeability equal to or greater than 1000. According to an embodiment, the first frame 510 may be formed of steel plate cold commercial (SPCC). The ratio ($\mu/\mu 0$) of the magnetic permeability to the vacuum permeability of the SPCC may be 5000.

According to various embodiments, the second frame 520 may be formed of a material having a high permeability. According to an embodiment, the second frame 520 may be formed of a material having a ratio ($\mu/\mu 0$) of a magnetic permeability to a vacuum permeability equal to or greater than 1000. According to an embodiment, the second frame 520 may be formed of SPCC. The ratio ($\mu/\mu 0$) of the magnetic permeability to the vacuum permeability of the SPCC may be 5000.

As such, a material having a high ratio ($\mu/\mu 0$) of a magnetic permeability to a vacuum permeability is used for the first frame 510 and/or the second frame 520. Therefore, the speaker 410 may be less affected by an electromagnetic field generated from the battery 420, thereby generating a sound of a more even sound quality and reducing noise generation.

According to various embodiments, the first frame 510 and the second frame 520 may be formed of materials having substantially the same permeability. In an example, the first frame 510 and the second frame 520 may be formed of substantially the same material. For example, the first frame 510 and the second frame 520 may include SPCC.

According to various embodiments, the first frame 510 and the second frame 520 may be formed in different thicknesses. For example, the thickness of the first frame 510 may be greater than the thickness of the second frame 520. For example, to effectively shield an electromagnetic field generated by the battery 420, the thickness of the first frame 510 may be greater than the thickness of the second frame 520. According to another embodiment, the thickness of the second frame 520 may be greater than the thickness of the first frame 510.

According to various embodiments, the second frame 520 may be formed of a material having a higher permeability than that of a material of the first frame 510 in order to effectively shield an electromagnetic field generated by the battery 420 disposed adjacent to the second frame 520. In an example, the speaker 410 may prevent or reduce the electromagnetic field caused by the battery 420 from being induced to the voice coil 530 of the speaker 410 through the second frame 520. According to an embodiment, the speaker 410 may prevent or reduce the electromagnetic field caused by the battery 420 from being induced to the voice coil 530 and the second voice coil 530*b* of the speaker 410 through the second frame 520.

According to various embodiments, the speaker 410 may include the first voice coil 530*a* and the second voice coil 530*b* to ensure an even sound quality through the speaker 410. In an example, the first voice coil 530*a* and the second voice coil 530*b* may be disposed on, directly or indirectly, one side of the second frame 520.

According to various embodiments, the first voice coil 530*a* may generate a sound in a mid-high sound range. In an example, the first voice coil 530*a* may include a twitter coil for generating a sound in the mid-high sound range. The sound in the mid-high sound range may be referred to as a sound in a first sound range.

According to various embodiments, the first voice coil 530*a* may be disposed in an area adjacent to the first surface 411 of the speaker 410.

According to various embodiments, the first diaphragm 560*a* may be disposed adjacent, directly or indirectly, to the first voice coil 530*a*.

In an embodiment, the second voice coil 530*b* may generate a sound in a low sound range. In an example, the second voice coil 530*b* may include a woofer coil for generating a sound in the low sound range. The sound in the low sound range may be referred to as a sound in a second sound range.

According to various embodiments, the second voice coil 530*b* may be disposed in an area adjacent to the second surface 412 of the speaker 410.

According to various embodiments, the second diaphragm 560*b* may be disposed adjacent and/or proximate to the second voice coil 530*b*. In an example, the thickness of the second diaphragm 560*b* may include about 0.5 mm.

According to various embodiments, the magnet 540 may be disposed to surround at least part of the first voice coil 530*a* and the second voice coil 530*b*.

According to various embodiments, the magnet 540 may form a magnetic field around the first voice coil 530*a*. As the magnet 540 is disposed to surround at least part of the first voice coil 530*a*, the magnet 540 may be disposed to have opposite polarities with respect to the first voice coil 530*a*. Vibrations may be generated in the first voice coil 530*a* due to interaction between a magnetic field formed by the magnet 540 and a magnetic field induced by the first voice coil 530*a*. The vibrations generated in the first voice coil 530*a* may be transmitted to the first diaphragm 560*a* coupled to the first voice coil 530*a* and converted into a sound in the mid-high sound range. In an example, the converted sound in the mid-high sound range may be emitted toward the first surface 411 of the first frame 510. In an example, the thickness of the magnet 540 disposed around the first voice coil 530*a* may include about 1.25 mm.

According to various embodiments, the first surface 411 included in the first frame 510 may include an opening for radiating a sound to the outside of the electronic device 300 (e.g., see 300 in FIG. 4). In an example, the first surface 411 of the first frame 510 may include an opening for radiating a sound through a protrusion (e.g., the protrusion 321 of FIG. 4).

According to various embodiments, the magnet 540 may form a magnetic field around the second voice coil 530*b*. As the magnet 540 is disposed to surround at least part of the second voice coil 530*b*, the magnet 540 may be disposed to have opposite polarities with respect to the second voice coil 530*b*. Vibrations may be generated in the second voice coil 530*b* due to interaction between a magnetic field formed by the magnet 540 and a magnetic field induced in the second voice coil 530*b*. The vibrations generated in the second voice coil 530*b* may be transmitted to the second diaphragm 560*b* connected to the second voice coil 530*b* and converted into a sound in the low sound range. In an example, the converted sound in the low sound range may be emitted toward the second surface 412 of the second frame 520.

According to various embodiments, the plate 550 may support the magnet 540. In an example, the plate 550 may be disposed to surround at least part of the first voice coil 530*a* and the second voice coil 530*b*. In an example, the plate 550 may include a first plate 550*a*, a second plate 550*b*, and a third plate 550*c*. In an example, the first plate 550*a* may be disposed to surround the outer circumferential surface of the first voice coil 530*a*. The third plate 550*c* may be disposed to surround the outer circumferential surface of the second voice coil 530*b*. The second plate 550*b* may be disposed along the inner circumferential surface of the first voice coil 530*a* and the inner circumferential surface of the second voice coil 530*b*. In an example, the thickness of the plate 550 may include about 0.4 mm.

Referring to FIG. 7A, according to various embodiments, the inner surface of the first frame 510 and the outer surface of the second frame 520 may be disposed to contact each other.

According to various embodiments, when the first frame 510 and the second frame 520 are formed of a stainless steel (e.g., SUS304), a magnetic field strength H inside the first frame 510 and the second frame 520 may be measured to be 50.33 A/m.

According to various embodiments, when the second frame 520 is formed of a material having a high permeability, the magnetic field strength H inside the first frame 510 and the second frame 520 may be measured to be 17.99 A/m.

According to various embodiments, when the first frame 510 is formed of a material having a high permeability, the magnetic field strength H inside the first frame 510 and the second frame 520 may be measured to be 41.43 A/m.

According to various embodiments, when the first frame 510 and the second frame 520 are formed of a material having a high permeability, the magnetic field strength H inside the first frame 510 and the second frame 520 may be measured to be 6.93 A/m.

According to various embodiments, when the second frame 520 is formed of a material having a high permeability and has a thickness of 0.3 mm, the magnetic field strength H inside the first frame 510 and the second frame 520 may be measured to be 17.98 A/m.

According to various embodiments, when the second frame 520 is formed of a material having a high permeability and has a thickness of 0.3 mm, and a high-permeability plate of 0.05 mm is disposed adjacent, directly or indirectly, to the second frame 520, the magnetic field strength H inside the first frame 510 and the second frame 520 may be measured to be 17.74 A/m.

According to various embodiments, when the second frame 520 and the speaker 410 are disposed to be spaced apart from each other by 1 mm, the magnetic field strength H inside the first frame 510 and the second frame 520 may be measured to be 13.62 A/m.

Referring to FIG. 7B, according to various embodiments, the outer surface of the first frame 510 and the inner surface of the second frame 520 may be disposed to contact each other. As the second frame 520 is disposed to protrude outward from the first frame 510 in a radial direction, the frame holes 521 formed in the second frame 520 may be formed far from the central axis (e.g., the central axis 410A of FIG. 5) of the speaker 410. An electromagnetic field generated from the battery 420 is propagated to the speaker 410 through the frame holes 521, and as the frame holes 521 are formed far from the central axis 410A of the speaker 410, the speaker 410 may be less affected by the electromagnetic field generated from the battery 420. Accordingly, the speaker 410 may generate a sound of a more even sound quality, and noise generation may be suppressed.

Referring to FIG. 7C, according to various embodiments, the outer surface of the first frame 510 and the inner surface of the second frame 520 may be disposed to contact each other. According to another embodiment, the inner surface of the first frame 510 and the outer surface of the second frame 520 may be disposed to contact each other. Side frame holes 521-1 may be formed on a side surface of the second frame 520. The side frame holes 521-1 may be formed far from the central axis (the central axis 410A of FIG. 5) of the speaker 410. An electromagnetic field generated from the battery 420 is propagated to the speaker 410 through the side frame holes 521-1, and as the side frame holes 521-1 are formed far from the central axis 410A of the speaker 410, the speaker 410 may be less affected by the electromagnetic field generated from the battery 420. Accordingly, the speaker 410 may generate a sound of a more even sound quality, and noise generation may be suppressed.

Figure 8:
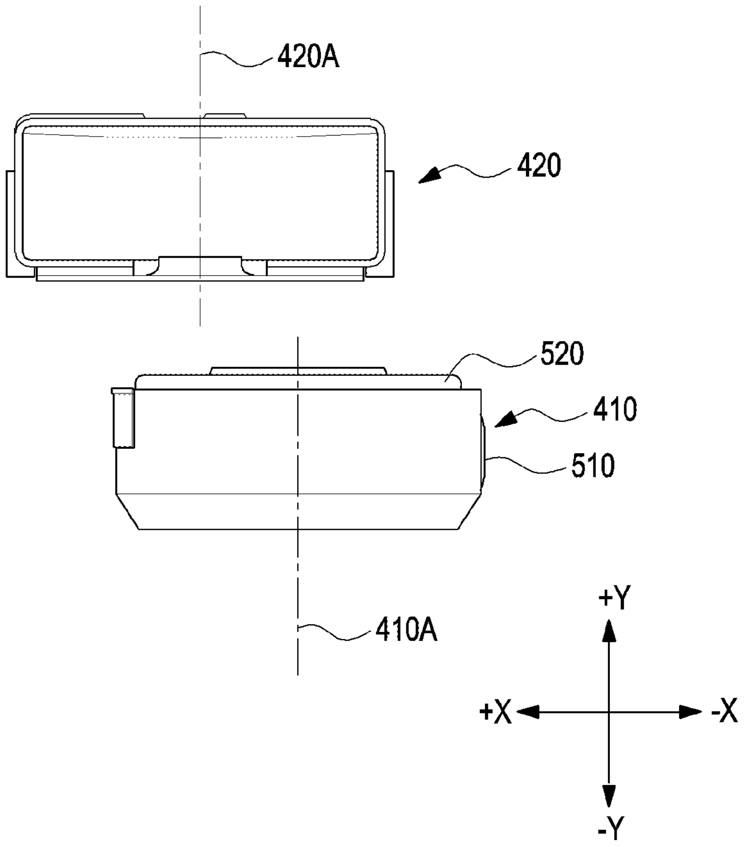
FIG. 8 is a side view illustrating a speaker and a battery according to various example embodiments.
Figure 9A:
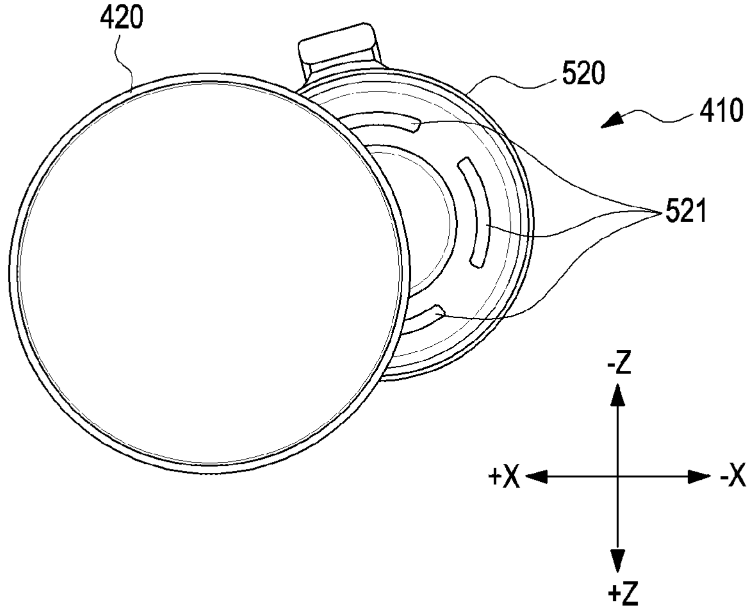
FIGS. 9A, 9B and 9C are plan views illustrating a speaker and a battery viewed in the −Y-axis direction according to various example embodiments.
Figure 9B:
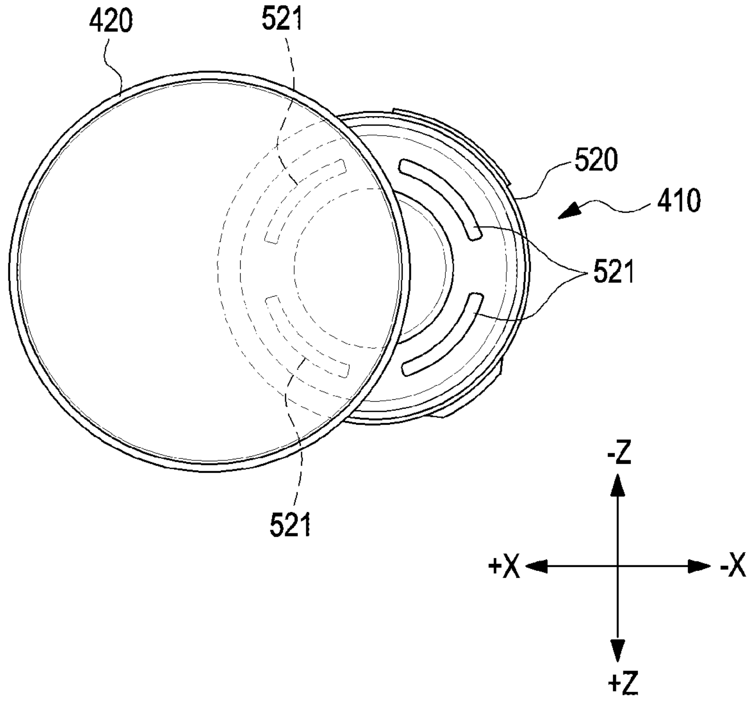
Figure 9C:
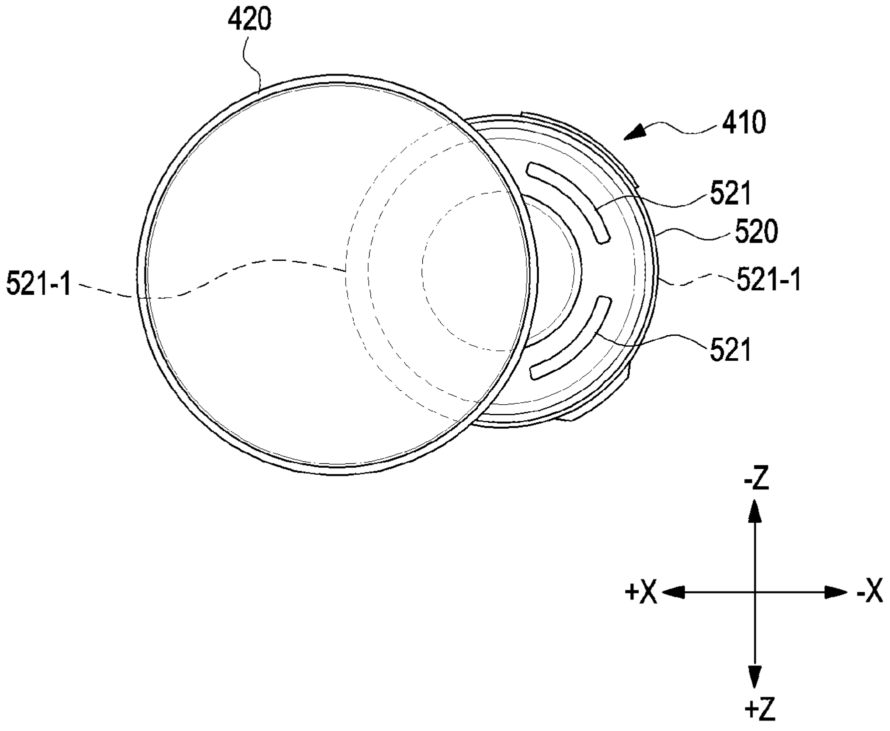

FIG. 8 is a side view illustrating a speaker and a battery according to various example embodiments. FIGS. 9A, 9B, and 9C are plan views illustrating a speaker and a battery viewed in the −Y-axis direction, according to various example embodiments;

The speaker 410, the battery 420, the first frame 510, the second frame 520, the frame holes 521, and the side frame holes 521-1 illustrated in FIGS. 8, 9A, 9B, and 9C may be the same as or similar to the speaker 410, the battery 420, the first frame 510, the second frame 520, the frame holes 521, and the side frame holes 521-1 illustrated in FIGS. 5, 6A, 6B, 6C, 7A, 7B, and 7C. Accordingly, a description of the same configuration may be omitted.

Referring to FIG. 8, according to various embodiments, the central axis 410A of the speaker 410 and the central axis 420A of the battery 420 may be disposed to be spaced apart from each other. According to an embodiment, the central axis 410A of the speaker 410 may be disposed to be spaced apart from the central axis 420A of the battery 420 in an X-axis direction and/or a Z-axis direction. As the central axis 410A of the speaker 410 and the central axis 420A of the battery 420 are spaced apart from each other, the strength of an electromagnetic field generated from the battery 420 and transmitted to the speaker 410 may be weakened. Accordingly, the speaker 410 may generate a sound of a more even sound quality, and noise generation may be reduced.

FIGS. 9A, 9B, and 9C illustrate embodiments of the speaker 410 and the battery 420 illustrated in FIG. 8.

Referring to FIGS. 9A, 9B, and 9C, according to various embodiments, it may be noted that the speaker 410 and the battery 420 are disposed such that the central axis (e.g., the central axis 410A of FIG. 8) of the speaker 410 and the central axis (e.g., the central axes 420A of FIG. 8) of the battery 420 are spaced apart from each other.

Referring to FIGS. 9A and 9B, according to various embodiments, as the central axis 410A of the speaker 410 and the central axis 420A of the battery 420 are spaced apart from each other, the frame holes 521 formed in the second frame 520 are disposed far from the battery 420, the strength of an electromagnetic field generated from the battery 420 and transmitted to the speaker 410 through the frame holes 521 may be weakened. Accordingly, the speaker 410 may generate a sound of a more even sound quality, and noise generation may be reduced.

Referring to FIG. 9C, according to various embodiments, the frame holes 521 and the side frame holes 521-1 may be formed in the second frame 520. According to an embodiment, the frame holes 521 may be formed at positions far from the battery 420. Since the frame holes 521 are disposed far from the battery 420, the strength of an electromagnetic field generated from the battery 420 and transmitted to the speaker 410 through the frame holes 521 may be weakened. Accordingly, the speaker 410 may generate a sound of a more even sound quality, and noise generation may be reduced.

According to various embodiments, the side frame holes 521-1 may be formed on a side surface of the second frame 520 adjacent to the battery 420. According to another embodiment, the side frame holes 521-1 may be formed on a side surface of the speaker 410 opposite to the battery 420. Since the side frame holes 521-1 are disposed far from the battery 420, the strength of an electromagnetic field generated from the battery 420 and transmitted to the speaker 410 through the side frame holes 521-1 may be weakened. Accordingly, the speaker 410 may generate a sound of a more even sound quality, and noise generation may be reduced.

Figure 10A:
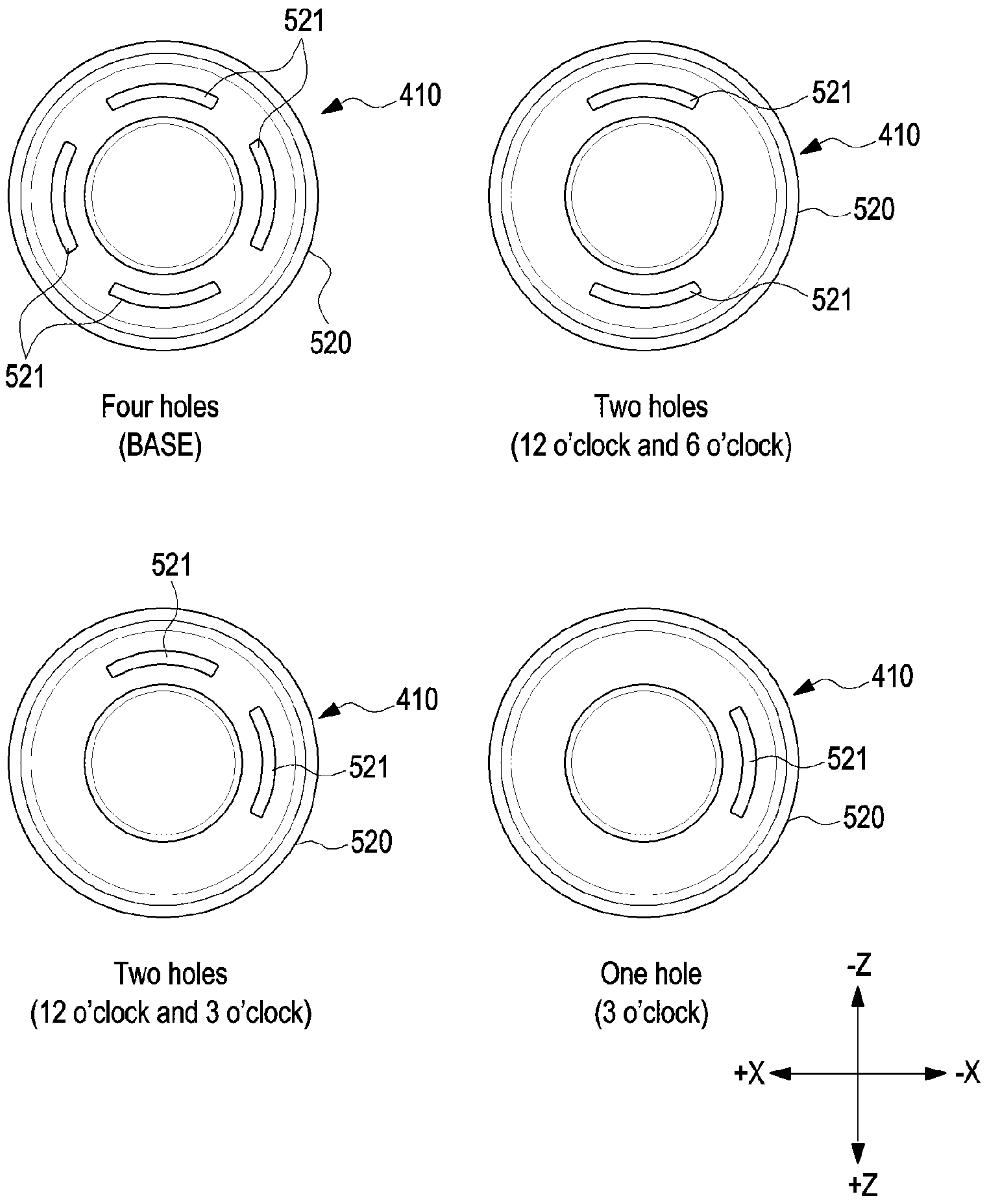
FIG. 10A illustrates various embodiments of a second frame in which a frame hole is formed according to various example embodiments.
Figure 10B:
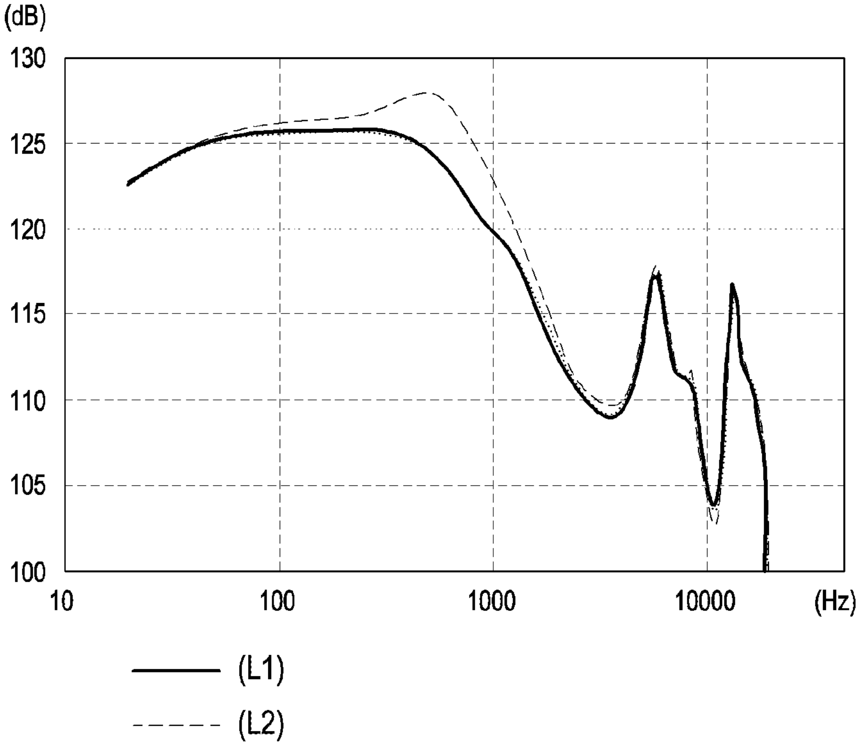
FIG. 10B illustrates experimental values of the second frame according to various example embodiments.

FIG. 10A illustrates various embodiments of a second frame in which a frame hole is formed according to various example embodiments. FIG. 10B illustrates experimental values of the second frame according to various example embodiments.

The speaker 410, the second frame 520 and the frame holes 521 illustrated in FIG. 10A may be the same as or similar to the speaker 410, the second frame 520, and the frame holes 521 illustrated in FIGS. 5, 6A, 6B, 6C, 7A, 7B, 7C, 8, 9A, 9B, and 9C. Accordingly, a description of the same configuration may be omitted.

According to various embodiments, at least one frame hole 521 may be formed in the second frame 520.

According to various embodiments, four frame holes 521 may be formed in the second frame 520. The four frame holes 521 may be formed symmetrically with respect to the central axis (e.g., the central axis 410A of FIG. 8) of the speaker 410.

According to various embodiments, two frame holes 521 may be formed in the second frame 520. According to an embodiment, the frame holes 521 may be formed in a 12 o'clock direction and a 6 o'clock direction in the second frame 520. According to an embodiment, the frame holes 521 may be formed in the 12 o'clock direction and a 3 o'clock direction in the second frame 520.

According to various embodiments, one frame hole 521 may be formed in the second frame 520. According to an embodiment, the frame hole 521 may be formed in the 3 o'clock direction in the second frame 520.

Referring to FIG. 10B, a graph illustrating sound gains (dB, Y axis) according to frequencies (Hz, X axis) may be noted.

According to various embodiments, a first graph L1 is for a case in which four frame holes 521 are formed in the second frame 520, and a second graph L2 is for a case in which at least one frame hole 521 is formed in the second frame 520 (in the 3 o'clock direction) or two frame holes 521 are formed in the second frame 520 (in the 12 o'clock and 6 o'clock directions or in the 12 o'clock and 3 o'clock directions).

According to various embodiments, it may be noted that the first graph L1 has larger values than the second graph L2 in a frequency range of about 500 Hz to about 1000 Hz. However, it may be noted that the difference (about 2 to 3 dB) between the values of the first graph L1 and the second graph L2 in the frequency range is not large. As such, even if the number of frame holes 521 is less than 4 or the frame holes 521 are not symmetrically formed, it may be seen that the sound quality of the low sound range in the speaker 410 is not significantly affected. At the same time, noise may not be generated due to less influence of the electromagnetic field from the battery 420.

Figure 11A:
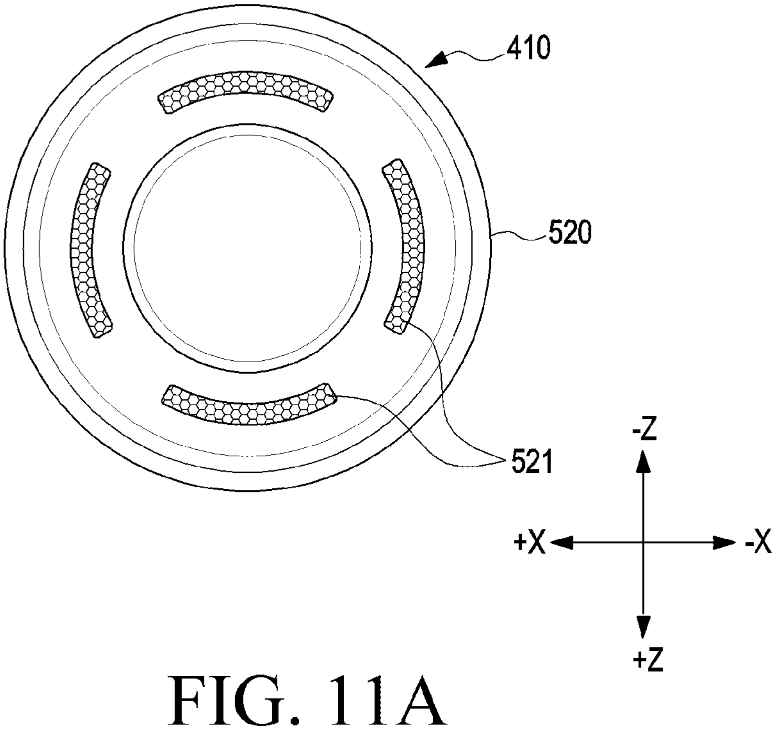
FIG. 11A is a bottom view illustrating a second frame in which a frame hole is formed, viewed in the −Y-axis direction according to various example embodiments.
Figure 11B:
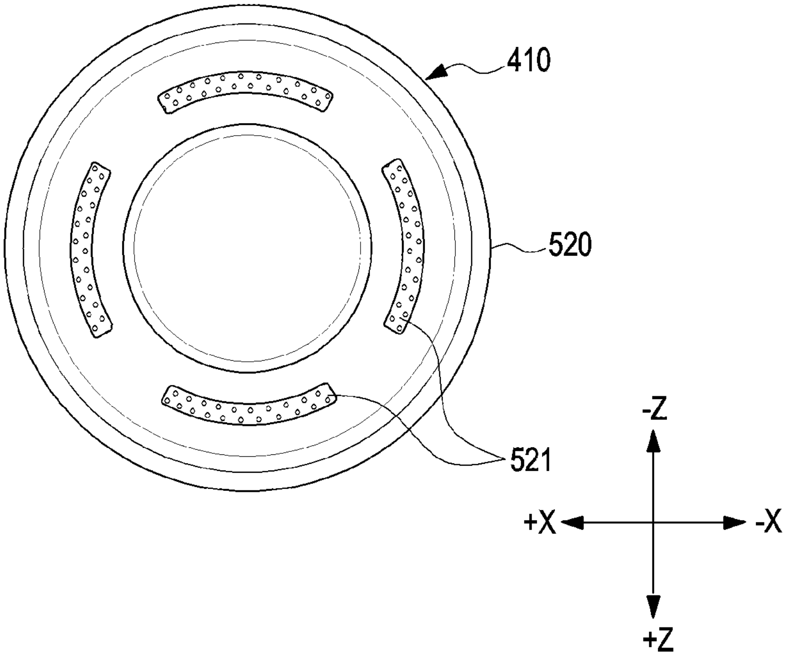
FIG. 11B is a bottom view illustrating a second frame in which a frame hole is formed, viewed in the −Y-axis direction according to various example embodiments.
Figure 11C:
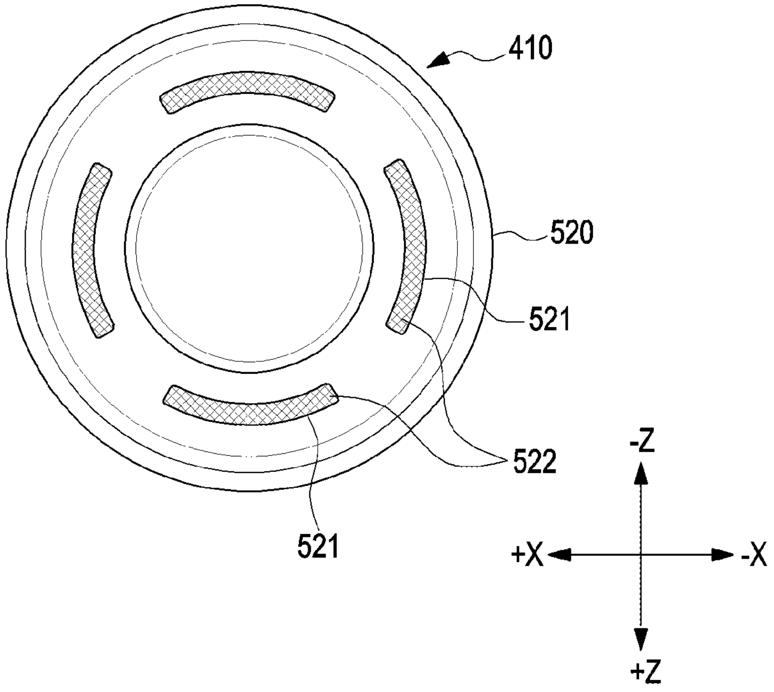
FIG. 11C is a bottom view illustrating a second frame in which a frame hole is formed, viewed in the −Y-axis direction according to various example embodiments.

FIG. 11A is a bottom view illustrating a second frame in which a frame hole is formed, viewed in the −Y-axis direction according to various example embodiments, FIG. 11B is a bottom view illustrating a second frame in which a frame hole is formed, viewed in the −Y-axis direction according to various example embodiments, and FIG. 11C is a bottom view illustrating a second frame in which a frame hole is formed, viewed in the −Y-axis direction according to various example embodiments.

The speaker 410, the second frame 520, and the frame holes 521 illustrated in FIGS. 11A, 11B, and 11C may be the same as or similar to the speaker 410, the second frame 520, and the frame holes 521 illustrated in FIGS. 5, 6A, 6B, 6C, 7A, 7B, and 7B. 7C, 8, 9A, 9B, 9C, and 10A. Accordingly, a description of the same configuration may be omitted.

Referring to FIG. 11A, according to various embodiments, the frame holes 521 may be formed in the second frame 520. According to an embodiment, the frame holes 521 may be formed by perforation in a grid pattern. As the frame holes 521 are perforated in a grid pattern, an area through which an electromagnetic field generated from the battery 420 passes may be reduced, thereby reducing the influence of the electromagnetic field on the speaker 410.

Referring to FIG. 11B, according to various embodiments, the frame holes 521 may be formed in the second frame 520. According to an embodiment, the frame hole 521 may be formed by perforation. As the frame holes 521 are perforated, an area through which an electromagnetic field generated from the battery 420 passes may be reduced, thereby reducing the influence of the electromagnetic field on the speaker 410.

Referring to FIG. 11C, according to various embodiments, the frame holes 521 may be formed in the second frame 520. According to an embodiment, meshes 522 may be disposed adjacent, directly or indirectly, to the frame holes 521. According to an embodiment, the meshes 522 may be formed of a metal material. As the meshes 522 are disposed on, directly or indirectly, the frame holes 521, an area through which an electromagnetic field generated from the battery 420 passes may be reduced, thereby reducing the influence of the electromagnetic field on the speaker 410.

Figure 12A:
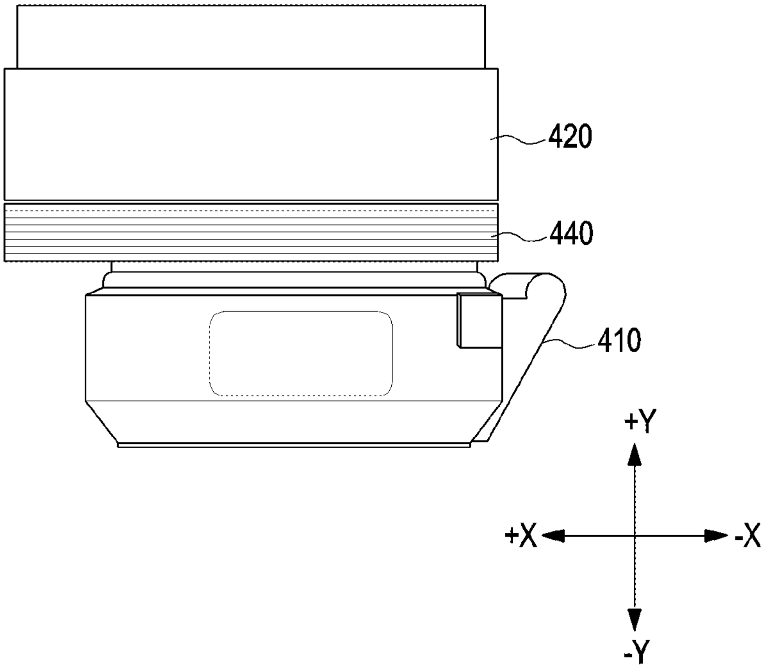
FIG. 12A is a side view illustrating a speaker, battery, and a winding according to various example embodiments.
Figure 12B:
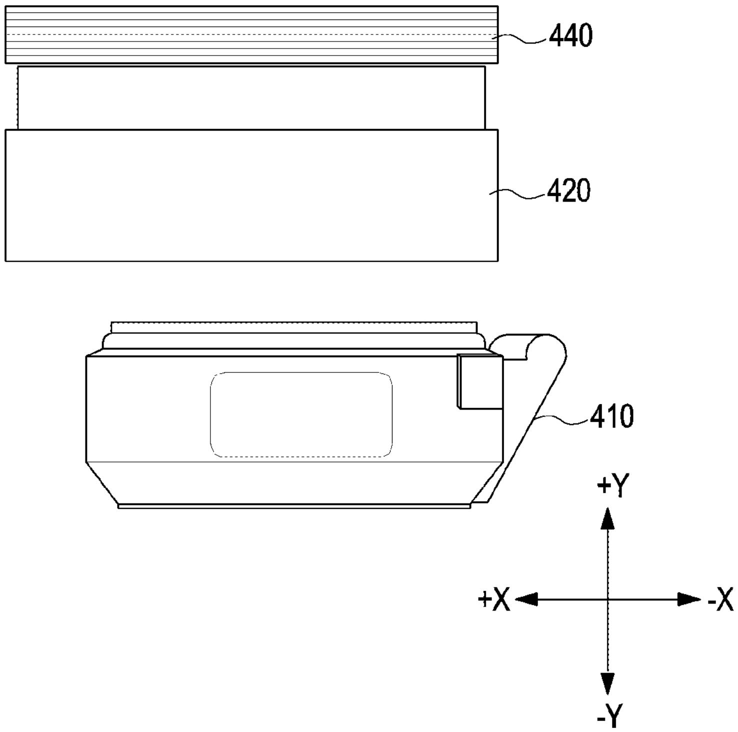
FIG. 12B is a side view illustrating a speaker, a battery, and a winding according to various example embodiments.
Figure 12C:
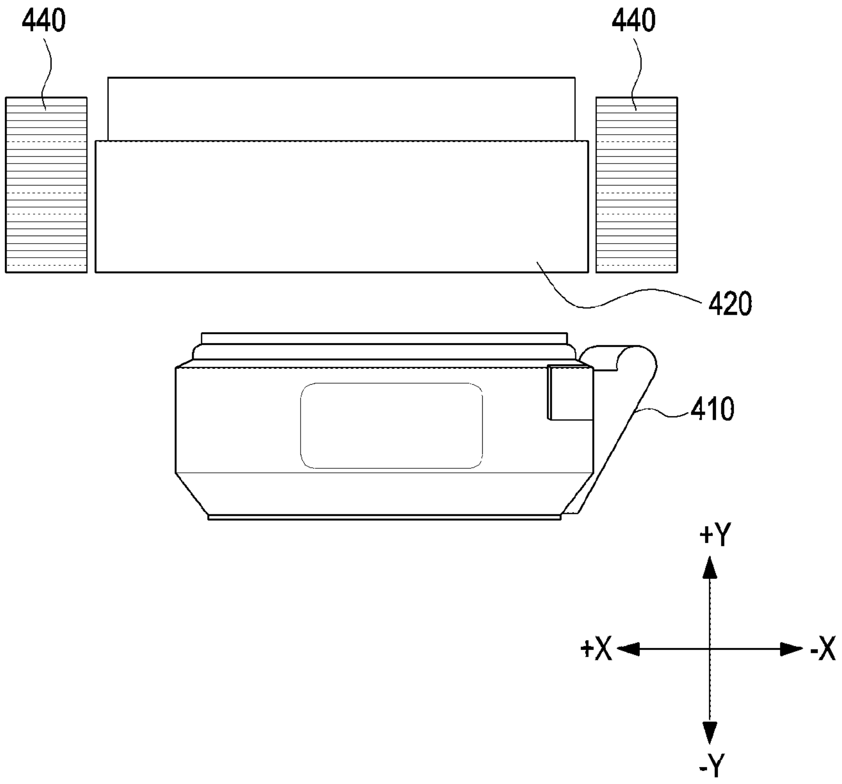
FIG. 12C is a side view illustrating a speaker, a battery, and a winding according to various example embodiments.

FIG. 12A is a side view illustrating a speaker, a battery, and a winding according to various example embodiments, FIG. 12B is a side view illustrating a speaker, a battery, and a winding according to various example embodiments, and FIG. 12C is a side view illustrating a speaker, a battery, and a winding according to various example embodiments.

The speaker 410 and the battery 420 disclosed in FIGS. 12A, 12B, and 12C may be the same or similar to the speaker 410 and the battery 420 illustrated in FIGS. 5, 6A, 6B, 6C, 7A, 7B, 7C, 8, 9A, 9B, 9C, 10A, 11A, 11B, and 11C. Accordingly, a description of the same configuration may be omitted.

Referring to FIGS. 12A, 12B, and 12C, according to various embodiments, the speaker 410 and the battery 420 may be disposed adjacent to each other. According to an embodiment, a winding 440 may be disposed adjacent, directly or indirectly, to the battery 420. An electromagnetic field generated from the battery 420 causes an eddy current effect, while passing through the winding 440. As the eddy current effect occurs in the winding 440, the magnetic force of the electromagnetic field passing through the winding 440 may be reduced. As the magnetic force of the electromagnetic field is reduced through the winding 440, noise generated from the speaker 410 may be reduced or suppressed.

Referring to FIG. 12A, according to various embodiments, the winding 440 may be disposed on, directly or indirectly, one of both sides (the Y-axis direction) of the battery 420, corresponding to a direction (the +Y-axis direction) in which the speaker 410 is disposed. Accordingly, the winding 440 may be disposed between the battery 420 and the speaker 410.

Referring to FIG. 12B, according to various embodiments, the winding 440 may be disposed on, directly or indirectly, the opposite side (the +Y-axis direction) to the side on which the speaker 410 is disposed, out of both sides (the Y-axis direction) of the battery 420.

Referring to FIG. 12C, according to various embodiments, the winding 440 may be disposed on, directly or indirectly, a side surface (the X-axis direction) of the battery 420.

An electronic device (e.g., the electronic device 300 of FIG. 3 and/or 4) according to various example embodiments may include a housing (e.g., the first housing 310 and the second housing 320 of FIG. 3 and/or 4), a first frame (e.g., the first frame 510 of FIG. 5) disposed inside the housing and including a first surface (e.g., the first surface 411 of FIG. 4), a second frame (e.g., the second frame 520 of FIG. 5) forming an internal space by being coupled with, directly or indirectly, the first frame, and including a second surface (e.g., the second surface 412 of FIG. 4) opposed to the first surface, a speaker (e.g., the speaker 410 of FIG. 4 and/or 5) disposed in the internal space and including at least one voice coil (e.g., the voice coil 530 of FIG. 7A), and a battery (e.g., the battery 420 of FIG. 4 and/or 5) disposed on, directly or indirectly, one side of the second frame. The second frame may include at least one frame hole (e.g., the frame holes 521 of FIG. 6C), and a ratio $\mu/\mu 0$ of a magnetic permeability to a vacuum permeability of at least one of a material of the first frame or a material of the second frame may be equal to or greater than 1000. The ratio $\mu/\mu 0$ of a magnetic permeability to a vacuum permeability may be at least 1000.

According to various embodiments, the voice coil may include a first voice coil (e.g., the first voice coil 530*a* of FIG. 7A) and a second voice coil (e.g., the second voice coil 530*b* of FIG. 7A), and the second voice coil may be disposed adjacent, directly or indirectly, to the second frame.

According to various embodiments, an outer surface of the second frame may contact an inner surface of the first frame.

According to various embodiments, an inner surface of the second frame may contact an outer surface of the first frame.

According to various embodiments, the frame hole may be formed on the second surface.

According to various embodiments, the frame hole may be a side frame hole formed on a side surface of the second frame.

According to various embodiments, a central axis (e.g., the central axis 420A of FIG. 5) of the battery may coincide with a central axis (e.g., the central axis 410A of FIG. 5) of the speaker.

According to various embodiments, a central axis (e.g., the central axis 420A of FIG. 8) of the battery may be spaced apart from a central axis (e.g., the central axis 410A of FIG. 8) of the speaker.

According to various embodiments, the electronic device may further include a winding (e.g., the winding 440 of FIG. 12A) disposed adjacent to the battery.

According to various embodiments, the electronic device may further include a mesh (e.g., the mesh 522 of FIG. 11C) disposed on the frame hole.

An electronic device (e.g., the electronic device 300 of FIG. 3 and/or 4) according to various example embodiments may include a housing (e.g., the first housing 310 and the second housing 320 of FIG. 3 and/or 4), a first frame (e.g., the first frame 510 of FIG. 5) disposed inside the housing and including a first surface (e.g., the first surface 411 of FIG. 4), a second frame (e.g., the second frame 520 of FIG. 5) forming an internal space by being coupled with, directly or indirectly, the first frame, and including a second surface (e.g., the second surface 412 of FIG. 4) opposed to the first surface, a speaker (e.g., the speaker 410 of FIGS. 4 and/or 5) disposed in the internal space and including a first voice coil (e.g., the first voice coil 530*a* of FIG. 7A) and a second voice coil (e.g., the second voice coil 530*b* of FIG. 7A), and a battery (e.g., the battery 420 of FIG. 4 and/or 5) disposed on, directly or indirectly, a side of the second frame. The second frame may include at least one frame hole (e.g., the frame holes 521 of FIG. 6C), and a ratio $\mu/\mu 0$ of a magnetic permeability to a vacuum permeability of at least one of a material of the first frame or a material of the second frame may be equal to or greater than 1000. The ratio $\mu/\mu 0$ of a magnetic permeability to a vacuum permeability may be at least 1000.

Each embodiment herein may be used in combination with any other embodiment(s) described herein.

According to various embodiments, an outer surface of the second frame may contact an inner surface of the first frame.

According to various embodiments, an inner surface of the second frame may contact an outer surface of the first frame.

According to various embodiments, the frame hole may be formed on the second surface.

According to various embodiments, the frame hole may be a side frame hole formed on a side surface of the second frame.

According to various embodiments, a central axis (e.g., the central axis 420A of FIG. 5) of the battery may coincide with a central axis (e.g., the central axis 410A of FIG. 5) of the speaker.

According to various embodiments, a central axis (e.g., the central axis 420A of FIG. 8) of the battery may be spaced apart from a central axis (e.g., the central axis 410A of FIG. 8) of the speaker.

According to various embodiments, the electronic device may further include a winding (e.g., the winding 440 of FIG. 12A) disposed adjacent, directly or indirectly, to the battery.

According to various embodiments, the electronic device may further include a mesh (e.g., the mesh 522 of FIG. 11C) disposed on, directly or indirectly, the frame hole.

According to various embodiments, the electronic device may further include an adhesive member comprising adhesive material (e.g., the adhesive member 570 of FIG. 6B) and a protection member comprising protective material (e.g., the protection member 580 of FIG. 6B).

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device including:

a housing defining a first internal space;

a first frame disposed at least partially inside the first internal space of the housing and including a first surface;

a second frame including a second surface opposed to the first surface, wherein the first frame and the second frame form a second internal space between the first and second surfaces and at least partially inside the first internal space;

a speaker disposed in the second internal space and including at least one voice coil; and a battery disposed on a side of the second frame, wherein the second frame includes at least one frame hole, and wherein a ratio $\mu/\mu 0$ of a magnetic permeability to a vacuum permeability of at least one of a material of the first frame or a material of the second frame is at least 1000.

2. The electronic device of claim 1, wherein the voice coil includes a first voice coil and a second voice coil, and the second voice coil is disposed adjacent to the second frame.

3. The electronic device of claim 1, wherein an outer surface of the second frame contacts an inner surface of the first frame.

4. The electronic device of claim 1, wherein an inner surface of the second frame contacts an outer surface of the first frame.

5. The electronic device of claim 1, wherein the frame hole is formed at least partially in the second surface.

6. The electronic device of claim 1, wherein the frame hole is a side frame hole formed at least partially in a side surface of the second frame.

7. The electronic device of claim 1, wherein a central axis of the battery coincides with a central axis of the speaker.

8. The electronic device of claim 1, wherein a central axis of the battery is spaced apart from a central axis of the speaker.

9. The electronic device of claim 1, further including a winding disposed adjacent to the battery.

10. The electronic device of claim 1, further including a mesh disposed on the frame hole.

11. An electronic device including:

a housing defining a first internal space;

a first frame disposed at least partially inside the first internal space of the housing and including a first surface;

a second frame including a second surface opposed to the first surface, wherein the first frame and the second frame form a second internal space between the first and second surfaces and at least partially inside the first internal space;

a speaker disposed in the second internal space and including a first voice coil and a second voice coil; and a battery disposed on a side of the second frame, wherein the second frame includes at least one frame hole, and wherein a ratio $\mu/\mu 0$ of a magnetic permeability to a vacuum permeability of at least one of a material of the first frame or a material of the second frame is at least 1000.

12. The electronic device of claim 11, wherein an outer surface of the second frame contacts an inner surface of the first frame.

13. The electronic device of claim 11, wherein an inner surface of the second frame contacts an outer surface of the first frame.

14. The electronic device of claim 11, wherein the frame hole is at least partially formed in the second surface.

15. The electronic device of claim 11, wherein the frame hole is a side frame hole at least partially formed in a side surface of the second frame.

16. The electronic device of claim 11, wherein a central axis of the battery coincides with a central axis of the speaker.

17. The electronic device of claim 11, wherein a central axis of the battery is spaced apart from a central axis of the speaker.

18. The electronic device of claim 11, further including a winding disposed adjacent to the battery.

19. The electronic device of claim 11, further including a mesh disposed on the frame hole.

20. The electronic device of claim 11, further including an adhesive member comprising adhesive material and a protection member disposed on the second frame.

* * * * *